(12) United States Patent
Andersson et al.

(10) Patent No.: US 11,182,512 B2
(45) Date of Patent: Nov. 23, 2021

(54) COMPONENT-BASED ARCHITECTURAL DESIGN OF A FLOOR PLAN OF A BUILDING OR AN OUTDOOR SPACE

(71) Applicant: AChoice AB, Höllviken (SE)

(72) Inventors: Ronny Andersson, Höllviken (SE); Andreas Battinelli, Helsingborg (SE); Johanna Enhörning, Malmö (SE); Johannes Igelström, Lund (SE)

(73) Assignee: ACHOICE AB, Höllviken (SE)

(*) Notice: Subject to any disclaimer, the term of this patent is extended or adjusted under 35 U.S.C. 154(b) by 480 days.

(21) Appl. No.: 16/303,153

(22) PCT Filed: May 19, 2017

(86) PCT No.: PCT/EP2017/062145
§ 371 (c)(1),
(2) Date: Nov. 20, 2018

(87) PCT Pub. No.: WO2017/198836
PCT Pub. Date: Nov. 23, 2017

(65) Prior Publication Data
US 2020/0320229 A1    Oct. 8, 2020

(30) Foreign Application Priority Data
May 20, 2016   (SE) ................... 1650691-7

(51) Int. Cl.
*G06F 30/13*   (2020.01)
*G06F 30/12*   (2020.01)
*G06F 111/16*  (2020.01)
*G06F 111/20*  (2020.01)

(52) U.S. Cl.
CPC ............ *G06F 30/13* (2020.01); *G06F 30/12* (2020.01); *G06F 2111/16* (2020.01); *G06F 2111/20* (2020.01)

(58) Field of Classification Search
CPC ........ G06F 30/398; G06F 30/00; G06F 30/13; G06F 30/12; G06F 2111/20; G06T 7/0004
See application file for complete search history.

(56) References Cited

U.S. PATENT DOCUMENTS 7,523,022 B2 * 4/2009 Thomas ................. G06F 30/00
                                                    703/1
8,260,581 B2 * 9/2012 Hoguet ................ G06F 30/398
                                                    703/1
(Continued)

FOREIGN PATENT DOCUMENTS

EP          2 506 170 A2    10/2012

OTHER PUBLICATIONS

International Search Report and Written Opinion for International Application No. PCT/EP2017/062145, dated Aug. 16, 2017.

*Primary Examiner* — Thai Q Phan
(74) *Attorney, Agent, or Firm* — Xsensus LLP

(57) ABSTRACT

A method for creating an architecturally designed floor plan of a building or an outdoor space, the method comprising choosing a first floor plan module to be added to said architecturally designed floor plan from a list comprising a plurality of floor plan modules said first floor plan module comprising at least a first side wall part having at least one side wall segment, based on said list comprising a plurality of floor plan modules, creating a sub-list of floor plan modules being fit for connection with said first floor plan module, where at least one side wall segment of each floor plan module of said list comprising a plurality of floor plan modules is assigned a value, said at least one side wall part of each floor plan module of said list of floor plan modules is assigned connection rules based on said values, said connection rules determining if and how said at least one side wall segment of said side wall part is fit for connection (Continued)

with a side wall segment of a side wall part of another floor plan module, and the step of creating said sub-list furthermore comprises comparing the value assigned to said at least one side wall segment of each of the plurality of floor plan modules of said list to the value assigned to said at least one side wall segment of said first side wall part of said first floor plan module while considering said connection rules to retrieve floor plan modules being fit for connection with said first floor plan module and adding to said sub-list said retrieved floor plan modules.

24 Claims, 8 Drawing Sheets

(56) References Cited

U.S. PATENT DOCUMENTS

| | | | |
|---|---|---|---|
| 9,151,608 B2* | 10/2015 | Malka | G01C 21/206 |
| 9,213,785 B2 | 12/2015 | Plewe | |
| 10,077,553 B2* | 9/2018 | Neumayr | E04B 2/44 |
| 10,606,963 B2* | 3/2020 | Tiwari | G06F 30/13 |
| 10,944,837 B2* | 3/2021 | Tiwari | H04L 67/16 |
| 2003/0009315 A1* | 1/2003 | Thomas | G06F 30/00 |
| | | | 703/1 |
| 2006/0111922 A1* | 5/2006 | Phillips | G06Q 30/0601 |
| | | | 705/26.1 |
| 2008/0109330 A1 | 5/2008 | Torres | |
| 2010/0198563 A1 | 8/2010 | Plewe | |
| 2011/0191069 A1* | 8/2011 | Madsen | G06F 30/13 |
| | | | 703/1 |
| 2011/0218777 A1* | 9/2011 | Chen | G06F 30/00 |
| | | | 703/1 |
| 2012/0253725 A1* | 10/2012 | Malka | G01C 21/206 |
| | | | 702/94 |
| 2013/0132042 A1* | 5/2013 | Chan | G06N 3/126 |
| | | | 703/1 |
| 2013/0144567 A1 | 6/2013 | Hoguet | |
| 2018/0038103 A1* | 2/2018 | Neumayr | E04C 2/3405 |
| 2018/0069932 A1* | 3/2018 | Tiwari | H04L 12/2803 |
| 2018/0075168 A1* | 3/2018 | Tiwari | G06T 7/0004 |
| 2018/0121571 A1* | 5/2018 | Tiwari | G08B 19/00 |

* cited by examiner

COMPONENT-BASED ARCHITECTURAL DESIGN OF A FLOOR PLAN OF A BUILDING OR AN OUTDOOR SPACE

The present invention relates in a first aspect to a method for designing a floor plan of a building. The present invention relates in a second aspect to a corresponding system for designing a floor plan of a building.

As used herein the word "floor plan modules" is intended to encompass rooms of any feasible type whether for domestic or industrial use, non-limiting examples being a living room, a kitchen, a family room, a bathroom, a hall, a bedroom, an office, an entrance, a utility room, a barn, a production room, a stable, a storage room and predefined and non-predefined combinations of such rooms. As used herein the word "floor plan modules" may in some embodiments be understood broader such as to also encompass outdoor rooms or spaces such as a terrace, a winter garden and even garden components such as a garden pond, a lawn and vegetations or growths. As used herein the word "floor plan modules" may in some embodiments even be understood broader yet such as to also encompass public outdoor rooms or spaces, such as park components, playground components or the like.

As used herein the word "side wall part" defines a part of a circumferential outer side wall of a floor plan module. Such a side wall part may, but is not limited to, be a part of a circumferential outer side wall of a floor plan module measured between two adjacent corners. Such a side wall part may also be a part of a circumferential outer side wall of a floor plan module measured between any two spaced apart points on the circumferential outer side wall.

As used herein the word "side wall segment" defines a sub-part of a side wall part, such that a side wall part may be sub-divided in one or more side wall segments.

As used herein the words "fit", "fitting" and other conjugations thereof are intended to have the meaning of "being compatible with" or "matching".

When creating and designing floor plans the user, typically an architect, desires to have as large a degree of freedom as possible on as many levels as possible such as to be able to customize the floor plan in as many details as necessary and desired. Therefore, many prior art systems for designing floor plans are concerned with enabling the user to alter and customize as many details as possible regarding the interior of the respective rooms of the floor plan.

U.S. Pat. No. 8,260,581 B discloses a system for home design in which it is possible to join distinct rooms in order to create a floor plan that includes multiple adjoined rooms. The system allows a user to join two or more rooms by merging a wall of each of the said rooms and determining which of the two walls should be given priority and overwrite the other wall. As such, the user has the choice of either keeping the wall of the first room or keeping the wall of the second room when merging two rooms. Additionally, the user can choose elements from both walls and combine them in order to create a customized adjoining wall. Furthermore, said distinct rooms can be combined so that they either align corner to corner or so that there is an offset between the two rooms. The offset means that one of the rooms is slid along the wall of the other room for a vertical reposition.

US 2010/198563 A1 discloses a system for component based architecture design, in which a database storing multiple pre-designed room components is accessed and a room component is chosen based certain input criteria, e.g. the room component's ability to connect to an already present room component. Once selected, the user connects the two components in any way the components allow and proceed to adjust any number of parameters.

However, the prior art systems only to a quite limited degree provides the user with the freedom to design and alter the outer side walls of the respective rooms. Therefore the prior art systems are imposing limitations on the user in respect of customization of side walls connecting neighboring rooms. Therefore there is a desire to provide a method and a system for designing a floor plan giving the user as much freedom as possible to customize the side walls of the respective rooms.

It is an object of the present invention to overcome the above problems, and to provide a method and a system for designing a floor plan which gives the user as much freedom as possible to customize the side walls of the respective rooms, and in particular side walls connecting neighboring rooms, which adheres to structural and architectural prerequisites and therefore is usable without or with only very little prior knowledge of architecture, and which thus allows for creating personalized floor plans without need for hiring often expensive professional architects.

It is a further object of the present invention to provide such a method and a system for designing a floor plan which incorporates the said customization of side walls as a part of the process of connecting rooms or floor plan modules during the creation of a floor plan.

According to a first aspect of the invention, this and other objects are achieved by means of a method for creating an architecturally designed floor plan of a building or an outdoor space, the method comprising the steps of:

choosing a first floor plan module to be added to the architecturally designed floor plan from a list comprising a plurality of floor plan modules, each floor plan module of the list comprising a plurality of floor plan modules comprising at least one side wall part comprising at least one side wall segment, and the first floor plan module comprising at least a first side wall part having at least one side wall segment, based on the list comprising a plurality of floor plan modules, creating a sub-list of floor plan modules being fit for connection with the first floor plan module, where the at least one side wall segment of each floor plan module of the list comprising a plurality of floor plan modules is assigned a value chosen from the group comprising the values i) opening, ii) wall, iii) wall or opening, iv) wall or door, v) wall or door or opening, vi) opening or door and vii) door, where the at least one side wall part of each floor plan module of the list of floor plan modules is assigned connection rules based on the values assigned to the at least one side wall segment, the connection rules determining if and how the at least one side wall segment of the side wall part is fit for connection with a side wall segment of a side wall part of another floor plan module, and where the step of creating the sub-list of floor plan modules furthermore comprises comparing the value assigned to the at least one side wall segment of each of the plurality of floor plan modules of the list comprising a plurality of floor plan modules to the value assigned to the at least one side wall segment of the first side wall part of the first floor plan module while considering the connection rules to retrieve floor plan modules being fit for connection with the first floor plan module and adding to the sub-list the retrieved floor plan modules being fit for connection with the first floor plan module.

Thus, a side wall segment is assigned one of the values i) to vii) defined above. It is noted that when a side wall segment is assigned the value i) opening this side wall segment must be an opening. Likewise, when a side wall segment is assigned the value ii) wall this side wall segment must be a wall. And likewise, when a side wall segment is assigned the value vii) door this side wall segment must be a door. Finally, when a side wall segment is assigned a value comprising an "or", such as the value iii) opening or wall, this side wall segment may be either of the value types separated by the "or". For example, a side wall segment assigned the value iii) opening or wall may be either of an opening and a wall. As can be seen, the values i) to vii) each comprise at least one value type chosen amongst wall, opening and door. Furthermore, as will be apparent from the below, each of the value types may further be assigned a value sub-type, i.e. opening type or wall type or door type, respectively, indicating the specific type of opening or wall or door, respectively, chosen or desired.

By providing the at least one side wall segment of each floor plan module of the list comprising a plurality of floor plan modules is assigned a value chosen from the group comprising the values i) opening, ii) wall, iii) wall or opening, iv) wall or door, v) wall or door or opening, vi) opening or door and vii) door, and by assigning to the at least one side wall part of each floor plan module of the list of floor plan modules connection rules based on the values assigned to the at least one side wall segment, the connection rules determining if and how the at least one side wall segment of the side wall part is fit for connection with a side wall segment of a side wall part of another floor plan module, a method for designing a floor plan giving the user a very high degree of freedom to customize the side walls of the respective rooms, and in particular side walls connecting neighboring rooms is obtained. Thereby, further possibilities for and degrees of freedom in designing a floor plan is provided to the user.

The assignment of a value to the at least one side wall segment of each floor plan module of the list comprising a plurality of floor plan modules further provides for a method for designing a floor plan which incorporates the customization of side walls as a part of the process of connecting rooms or floor plan modules during the creation of a floor plan. This provides an optimum degree of freedom in designing the side wall part connecting two floor plan modules. The assignment of a value to the at least one side wall segment of each floor plan module of the list comprising a plurality of floor plan modules further provides for a method in which the need related to at least some prior art methods such as that of U.S. Pat. No. 8,260,581 B of defining one of a pair of connecting floor plan components as a master component, or a prioritized component is removed, thus providing a simpler method.

Thereby, the method according to the invention enables a user to create a floor plan with little or no architectonic background in a way so that the resulting floor plan adheres to both structural and architectonic prerequisites, and thereby to allow the user to create a personalized home without having to hire an often very expensive architect to design the house.

Furthermore, creating the sub-list by comparing the value assigned to the at least one side wall segment of each of the plurality of floor plan modules of the list comprising a plurality of floor plan modules to the value assigned to the at least one side wall segment of the first side wall part of the first floor plan module while considering the connection rules to retrieve floor plan modules being fit for connection with the first floor plan module and adding to the sub-list the retrieved floor plan modules being fit for connection with the first floor plan module, provides for a method for designing a floor plan in which the user is presented with not only a wide variety of rooms modules, but all possible floor plan modules amongst which the user may then choose the most desirable possibility.

In an embodiment the first side wall part of the first floor plan module comprises a plurality of side wall segments, each side wall segment of the plurality of side wall segments of the first side wall part of the first floor plan module is assigned a value chosen from the group comprising the values i) opening, ii) wall, iii) wall or opening, iv) wall or door, v) wall or door or opening, vi) opening or door and vii) door, and the step of creating the sub-list of floor plan modules comprises comparing the value assigned to the at least one side wall segment of each of the plurality of floor plan modules of the list comprising a plurality of floor plan modules to the value assigned to each side wall segment of the plurality of side wall segments of the first side wall part of the first floor plan module while considering the connection rules to retrieve floor plan modules being fit for connection with the first floor plan module and adding to the sub-list the retrieved floor plan modules being fit for connection with the first floor plan module.

In an embodiment each floor plan module of the list of floor plan modules comprises at least one side wall part having a plurality of side wall segments, each side wall segment of the plurality of side wall segments is assigned a value chosen from the group comprising the values i) opening, ii) wall, iii) wall or opening, iv) wall or door, v) wall or door or opening, vi) opening or door and vii) door, and the step of creating the sub-list of floor plan modules comprises comparing the value assigned to each side wall segment of the plurality of side wall segments of each of the plurality of floor plan modules of the list comprising a plurality of floor plan modules to the value assigned to the plurality of side wall segments of the first side wall part of the first floor plan module while considering the connection rules to retrieve floor plan modules being fit for connection with the first floor plan module and adding to the sub-list the retrieved floor plan modules being fit for connection with the first floor plan module.

Each of the two above embodiments provide for a method giving the user an even higher and more optimized degree of freedom in designing the side wall part connecting two floor plan modules, and thus in designing a floor plan as the number of customizable elements is increased further.

In an embodiment the connection rules include that side wall segments with the following respective values are fit for connection with one another:

i) opening and any one of i) opening, iii) wall or opening, v) wall or door or opening, and vi) opening or door, ii) wall and any one of ii) wall, iii) wall or opening, iv) wall or door and v) wall or door or opening, iii) wall or opening and any one or more of i) opening, ii) wall, iii) wall or opening, iv) wall or door, v) wall or door or opening and vi) opening or door, iv) wall or door and any one of ii) wall, iii) wall or opening, iv) wall or door, v) wall or door or opening, vi) opening or door and vii) door, v) wall or door or opening and any one of i) opening, ii) wall, iii) wall or opening, iv) wall or door, v) wall or door or opening, vi) opening or door and vii) door, vi) opening or door and any one of i) opening, iii) wall or opening, iv) wall or door, v) wall or door or opening, vi) opening or door and vii) door, and vii) door and any one of iv) wall or door, v) wall or door or opening, vi) opening or door and vii) door, and/or the connection rules include that side wall segments with the following respective values are not fit for connection with one another:

i) opening and any one of ii) wall, iv) wall or door, and vii) door, ii) wall and any one of i) opening, vi) opening or door and vii) door, iii) wall or opening and vii) door, iv) wall or door and i) opening, vi) opening or door and ii) wall, and vii) door and any one of i) opening, ii) wall and iii) wall or opening.

In an embodiment the values assigned to the at least one side wall segment comprise at least one value type chosen from the group comprising wall, opening and door, and the value type wall of any one or more side wall segment is assigned one of a plurality of wall types, such as for example an exterior wall, an interior wall, a brick wall, a concrete wall, a gypsum wall, a glass wall, a wooden wall, a load-carrying wall, a non-load-carrying wall and any combination thereof, and/or the value type opening of any one or more side wall segment is assigned one of a plurality of opening types, such as for example a window, a side hung window, a center hung window, a top hung window, a leafless opening, a ventilation opening and any combination thereof, and/or the value type door of any one or more side wall segment is assigned one of a plurality of door types, such as for example a glass door, a wooden door, a one-leafed sliding or rolling door and a two-leafed sliding or rolling door.

In fact even the specific model of a wall type, opening type or door type may be assigned to a value type in this way. Each of these possibilities of assigning what is also described herein as value sub-types (i.e. opening types, wall types or door types) to a value type thus provide for a method giving the user the possibility of designing the side wall part connecting two floor plan modules in exactly the way desired, and thus gives the user a particularly high degree of freedom in designing a floor plan.

In an embodiment any one or more side wall segment is assigned a position on an associated side wall part of a floor plan module, wherein the position may be altered within predetermined conditions for altering the position, and the step of creating the sub-list comprises comparing the value assigned the any one or more side wall segment assigned a position in each possible position to the value assigned to the plurality of side wall segments of the first side wall part of the first floor plan module while considering the connection rules.

Thereby a method is provided with which possible positional variations of side wall segments of a given floor plan module may be taken into account, thereby further increasing the possibilities available and thus the degree of freedom in designing a floor plan.

In an embodiment the at least one side wall part of each floor plan module of said list of floor plan modules is assigned connection sub-rules, said connection sub-rules defining that at least one of an opening, wall or door is preferred or required at said one or more side wall segment and/or at said at least one position assigned to said one or more side wall segment.

Thereby a method is provided with which architectural and/or constructional prerequisites may be taken into account in a manner being simple and straight forward for the user.

In an embodiment the step of creating a sub-list of floor plan modules furthermore comprises filtering out floor plan modules of the list of floor plan modules which, when considering the connection rules, during the comparing turn out to not to be fit for connection with the first floor plan module, and/or which do not comply with predefined architectural preferences.

Thereby a method is provided with which only actual fits are taken into account when compiling the sub-list and with which it is furthermore possible to also take into account further preferences, e.g. architectural preferences, all in all thereby making the resulting sub-list more manageable.

In an embodiment the method further comprises the steps of:

choosing a second floor plan module from the sub-list comprising a plurality of floor plan modules to be added to the architecturally designed floor plan, the second floor plan module comprising at least a second side wall part having at least one side wall segment, and connecting the side wall segments of the first side wall part of the first floor plan module to the side wall segments of the second side wall part of the second floor plan module, where the step of connecting the side wall segments of the first side wall part of the first floor plan module to the side wall segments of the second side wall part of the second floor plan module is performed in such a way as to comply with the connection rules.

In a further embodiment the step of connecting the side wall segments of the first side wall part of the first floor plan module to the side wall segments of the second side wall part of the second floor plan module further comprises replacing the side wall part of one of the first floor plan module and the second floor plan module with the side wall part of the other one of the first floor plan module and the second floor plan module.

By either of the two above embodiments a method is provided with which a floor plan with correct side wall part connections, and thus floor plan module connections, which may be realized on a real life building or other architectural or landscape architectural construction in a straight-forward manner is provided for. Replacing one side wall part with another, and noting the same may be done for one or more pairs of side wall segments, further provides for a particularly simple method.

In an embodiment the method further comprises the step of based on user-input altering any one of the wall type, opening type and door type.

Thereby a method is provided with which possible positional variations of side wall segments of a given floor plan module may be exploited by the user and subsequently taken into account if desired. Thereby the possibilities available and thus the degree of freedom in designing a floor plan are increased further.

In an embodiment the method further comprises one or more of the following steps:

displaying the list comprising a plurality of floor plan modules to a user, displaying the chosen first floor plan module to a user, displaying the sub-list to a user, and displaying the architecturally designed floor plan to a user.

Thereby a method is provided with which optimum manageability and overview is provided to the user.

In embodiments the step of adding a first floor plan module from the list comprising a plurality of floor plan modules to the architecturally designed floor plan comprises selecting the first floor plan module to be added.

In embodiments the step of adding a floor plan module from the sub-list comprising a plurality of floor plan modules to the architecturally designed floor plan comprises selecting the floor plan module to be added.

Any of the two above-mentioned embodiments provide for a method in which user input may be taken into account when compiling or creating the sub-list.

In embodiments one or more attributes may be assigned to each of the floor plan modules, non-limiting examples being price, size in square meter, number of windows and number of doors, as well as other attributes having an effect on the price, and, when combining and altering the modules, the price and the square meter of the floor plan is calculated. Thereby an effective and straight forward to use tool for keeping up to date on the price, size or the like of a desired floor plan is obtained.

In further or alternative embodiments one or more such attributes, as well as other attributes such as the size or price of an opening or wall or door, may also be assigned to each of the side wall parts or even each of the side wall segments, in the latter case e.g. by assigning said attributes to a relevant value sub-type.

In a second aspect, the above and other objects and advantages are achieved by means of a floor plan design system for creating an architecturally designed floor plan of a building or an outdoor space, the system comprising:

a data processing device and a computer readable medium, the computer readable medium comprising:

a list comprising a plurality of floor plan modules, each floor plan module comprising at least one side wall part comprising at least one side wall segment, and instructions configured for execution at the data processing device such as to cause the data processing device to:

receive a user selection and in reaction to the user selection retrieve a first floor plan module to be added to the architecturally designed floor plan from the list comprising a plurality of floor plan modules, the first floor plan module comprising at least a first side wall part having at least one side wall segment, and based on the list comprising a plurality of floor plan modules, create a sub-list of floor plan modules being fit for connection with the first floor plan module, assign to the at least one side wall segment of each floor plan module of the list comprising a plurality of floor plan modules a value chosen from the group comprising the values i) opening, ii) wall, iii) wall or opening, iv) wall or door, v) wall or door or opening, vi) opening or door and vii) door, assign to the at least one side wall part of each floor plan module of the list of floor plan modules connection rules based on the values assigned to the at least one side wall segment, the connection rules determining if and how the at least one side wall segment of the side wall part is fit for connection with a side wall segment of a side wall part of another floor plan module, and create the sub-list of floor plan modules by comparing the value assigned to the at least one side wall segment of each of the plurality of floor plan modules of the list comprising a plurality of floor plan modules to the value assigned to the at least one side wall segment of the first side wall part of the first floor plan module while considering the connection rules to retrieve floor plan modules being fit for connection with the first floor plan module and adding to the sub-list the retrieved floor plan modules being fit for connection with the first floor plan module.

In a third aspect, the above and other objects and advantages are achieved by means of a data processing device and a computer readable medium, the computer readable medium comprising a list comprising a plurality of floor plan modules, each floor plan module comprising at least one side wall part comprising at least one side wall segment, and instructions configured for execution at the data processing device such as to cause the data processing device to carry out a method according to the first aspect of the invention. The instructions may be configured as described in connection with the system according to the second aspect of the invention.

It is noted that the method and system according to the invention may be used both to design a new floor plan of a building, and to design an extension of a building or in other words an extension of an existing floor plan of a building. In case of an extension, this can be done by defining the side wall part of the existing floor plan module, which in this case is equal to the existing floor plan, which will be changed with the extension. Then, by means of the method and system according to the invention, it is possible to list and display which alternative extensions (e.g. rooms, garage, winter garden etc.) can be added to the existing floor plan of a building.

It is furthermore noted that the method and system according to the invention may in principle also be used to design a new floor plan or an extension of an existing floor plan in a more broad sense, i.e. such as to also encompass, for instance, landscape architectural floor plans such as gardens, parks, playgrounds, skate parks and so forth.

It is noted that the invention relates to all possible combinations of features recited in the claims.

This and other aspects of the present invention will now be described in more detail, with reference to the appended drawings showing embodiment(s) of the invention.

Figure 4:
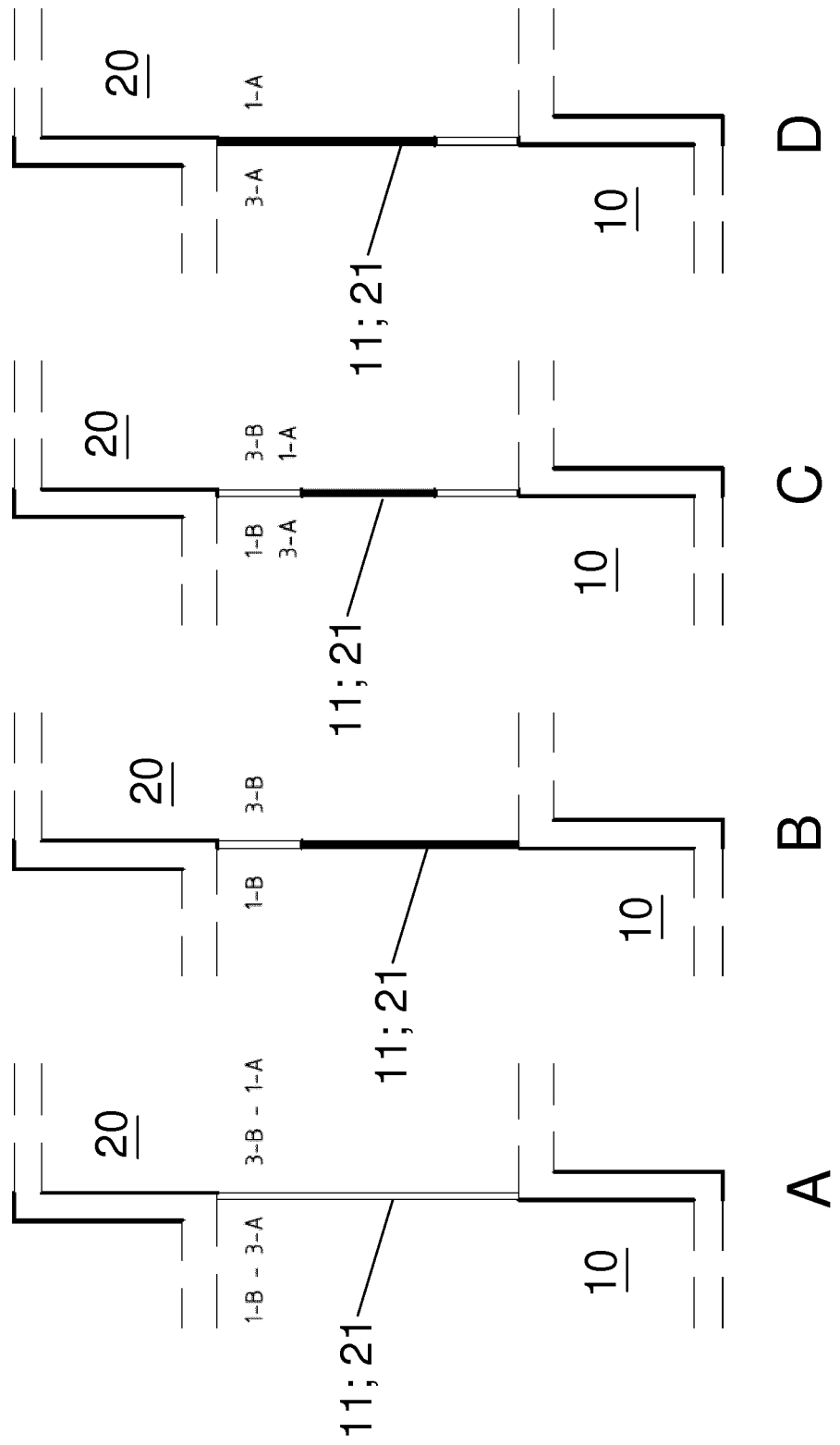

FIG. 4 schematically shows four different examples of floor plan modules being connected to each other while taking into account connection rules based on values assigned to the side wall segments present, while having displaced the floor plan modules with respect to one another.

Figure 5:
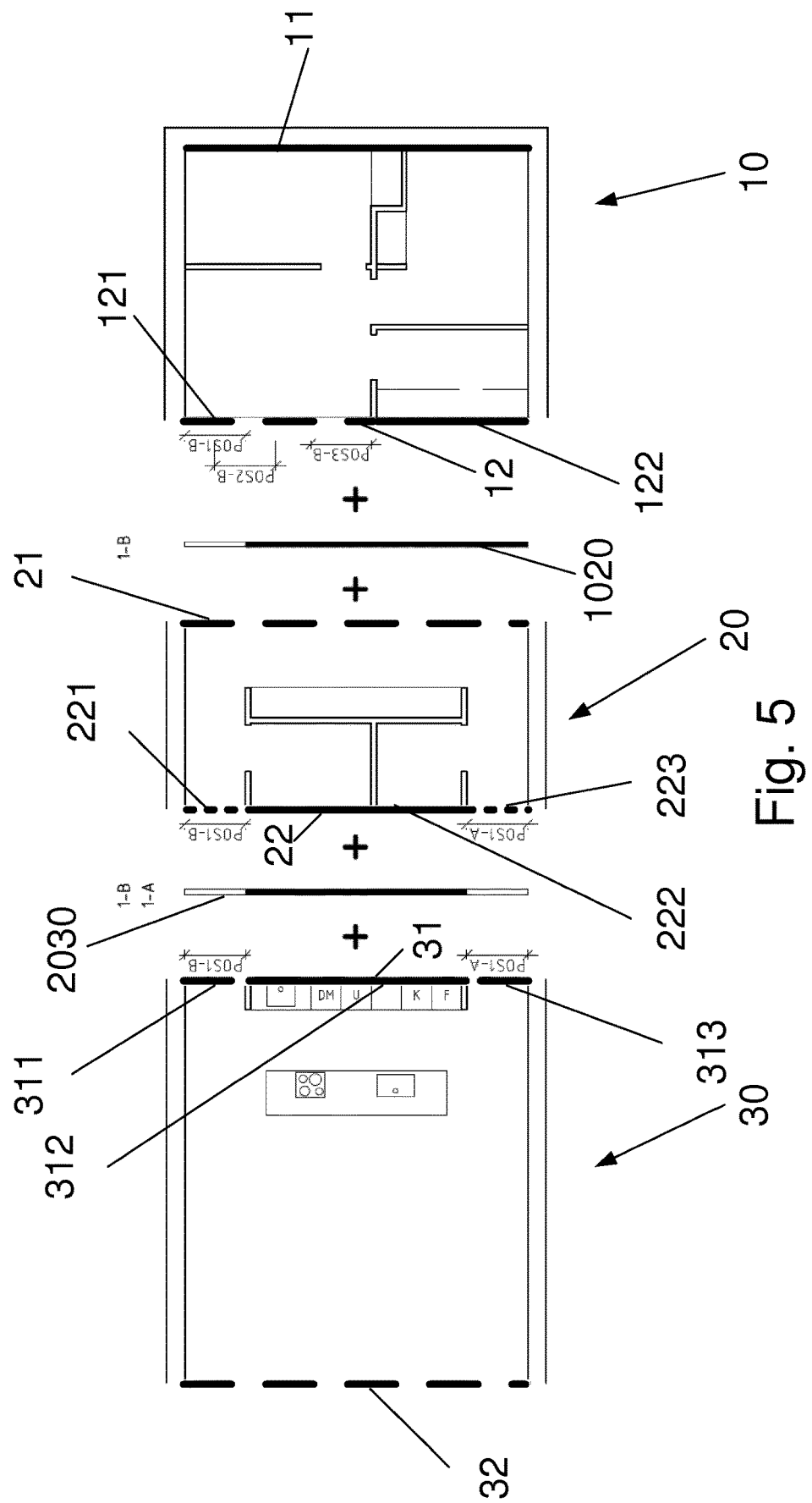

FIG. 5 schematically shows an example in which three floor plan modules are being connected to each other while taking into account connection rules based on values assigned to the side wall segments present.

Figure 6:
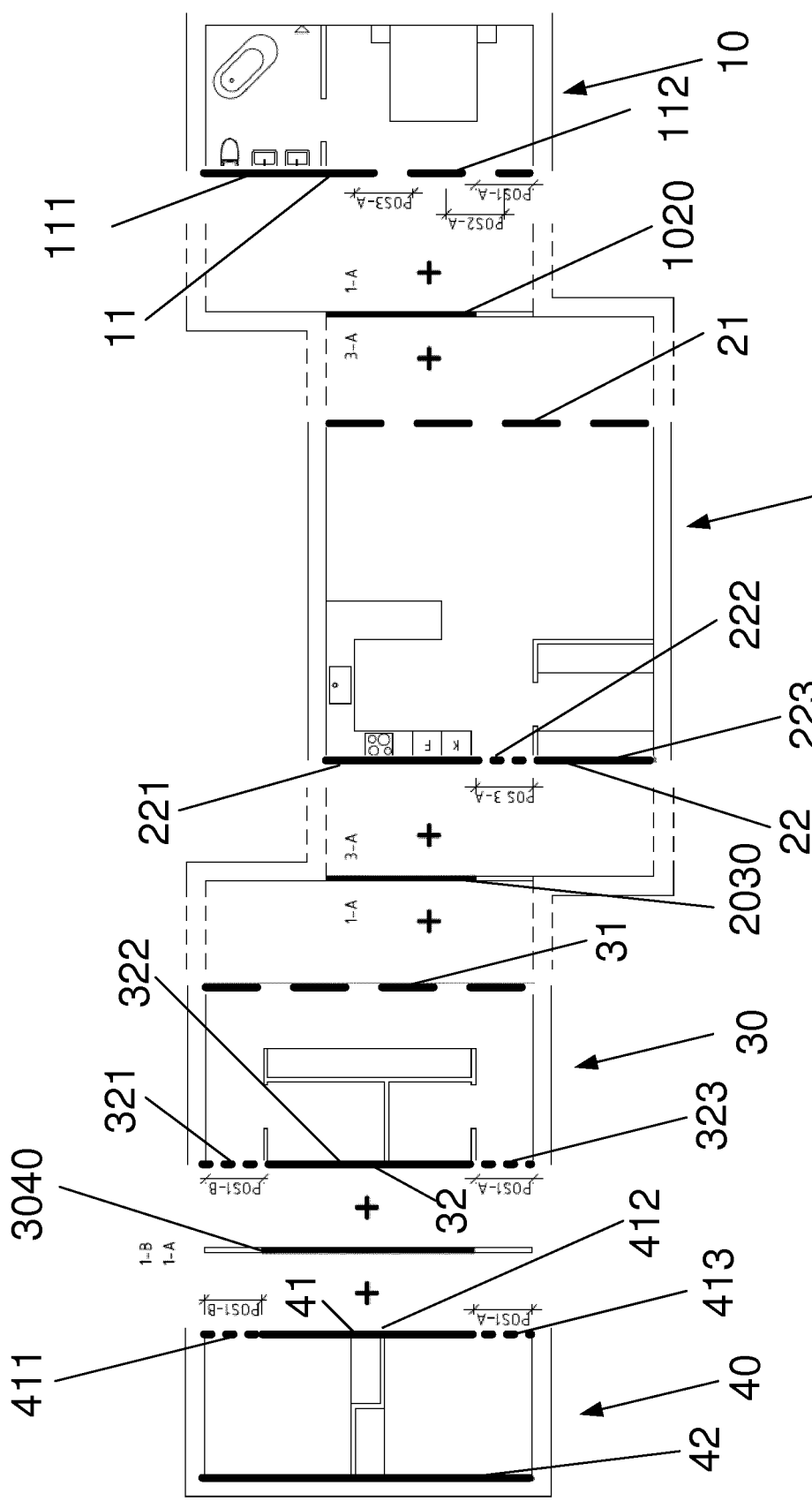

FIG. 6 schematically shows an example in which four floor plan modules are being connected to each other while taking into account connection rules based on values assigned to the side wall segments present, while having displaced at least some of the floor plan modules with respect to one another.

Figure 7:
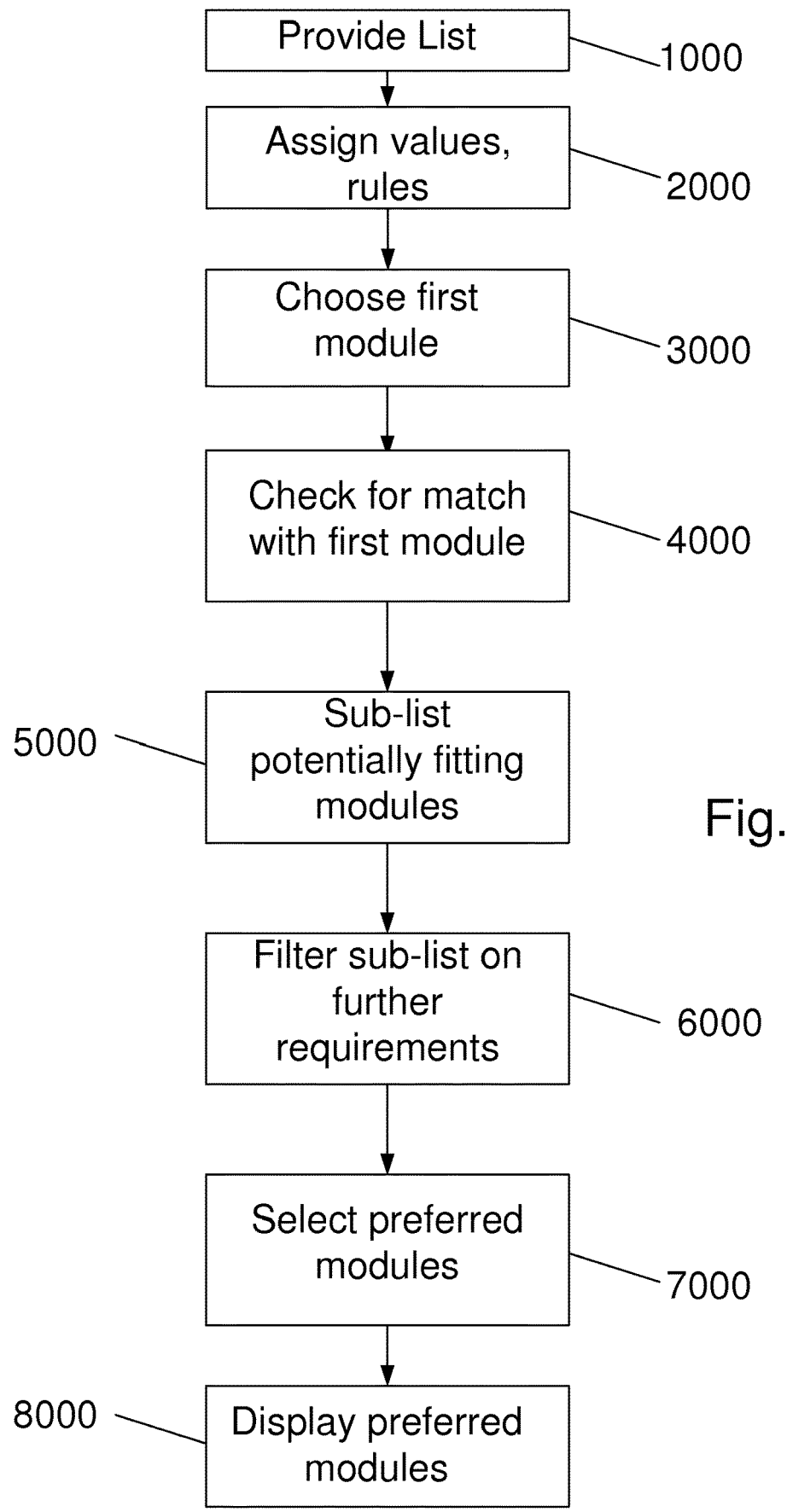

FIG. 7 shows a block diagram illustrating an exemplary method according to the first aspect of the invention.

Figure 8:
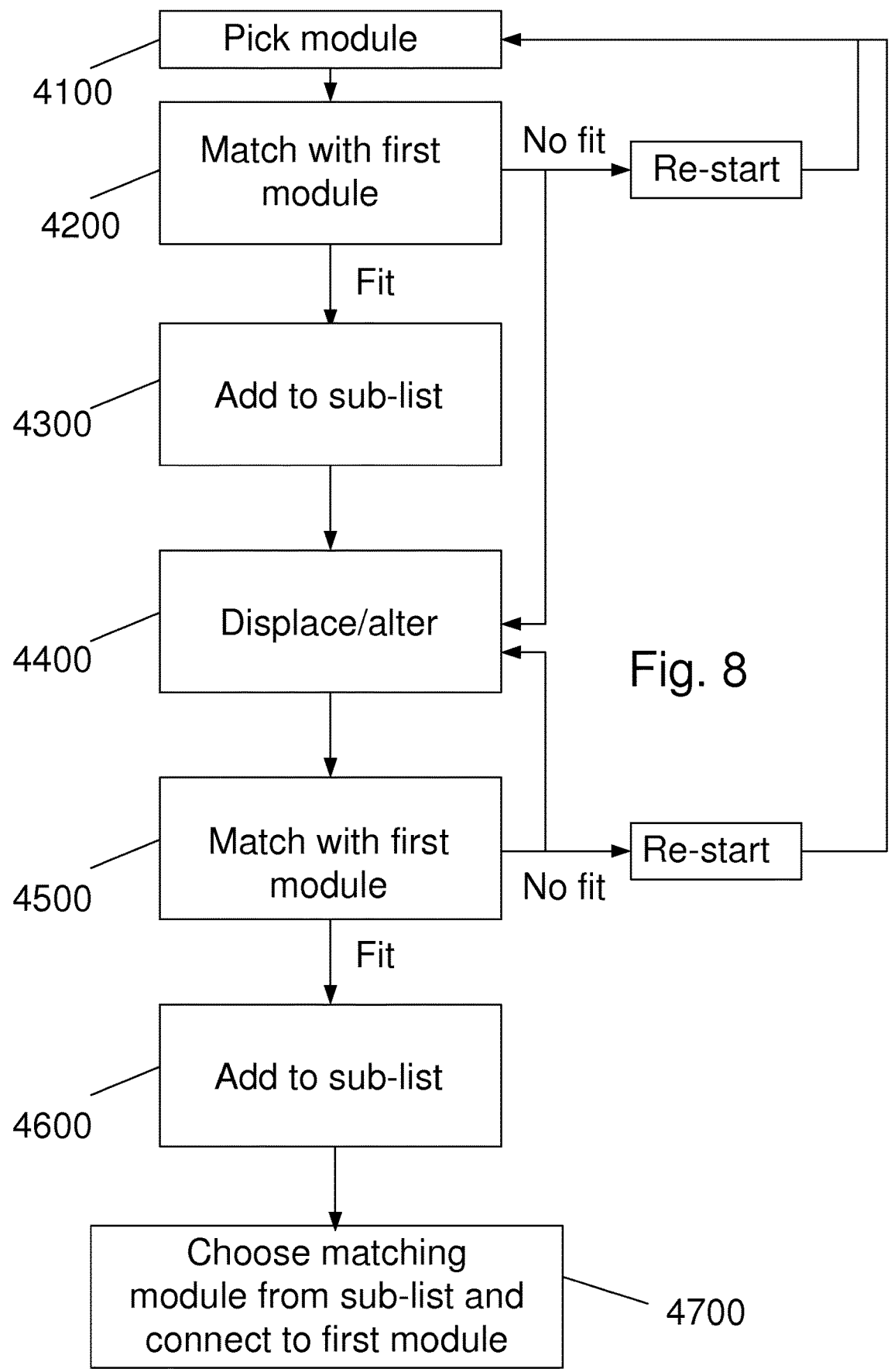

FIG. 8 shows a block diagram illustrating in more detail the steps involved in checking for match with a selected first floor plan module.

Figure 9:
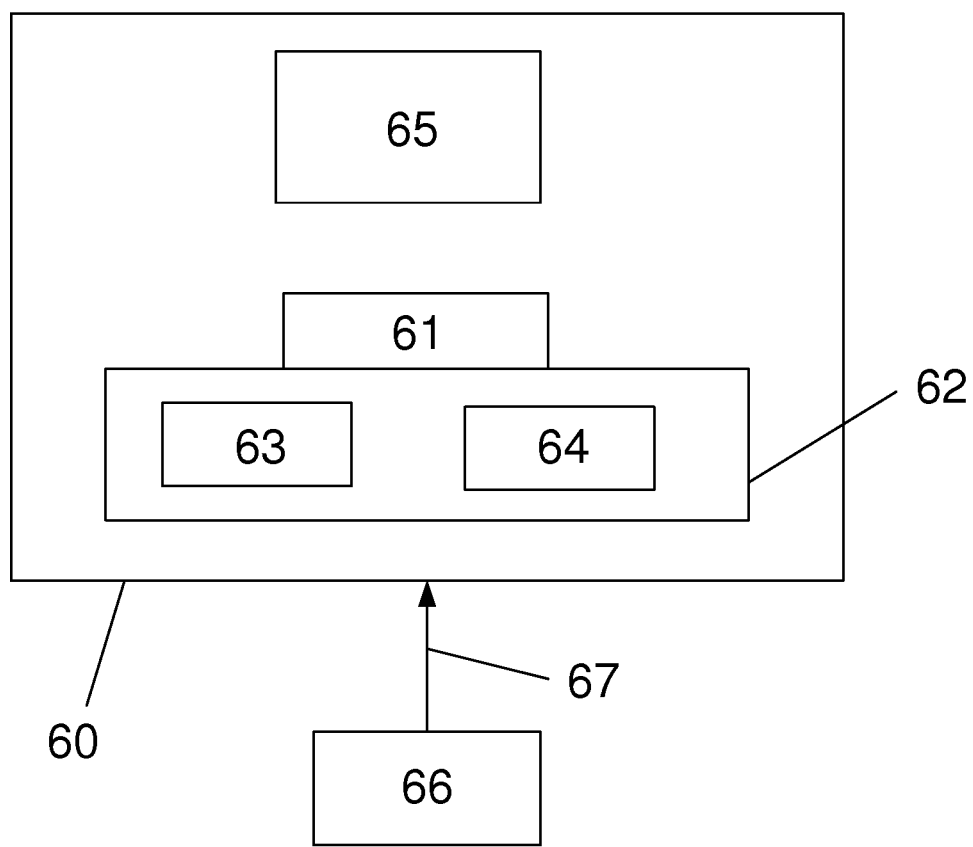

FIG. 9 illustrates schematically an example of a system according to the second aspect of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
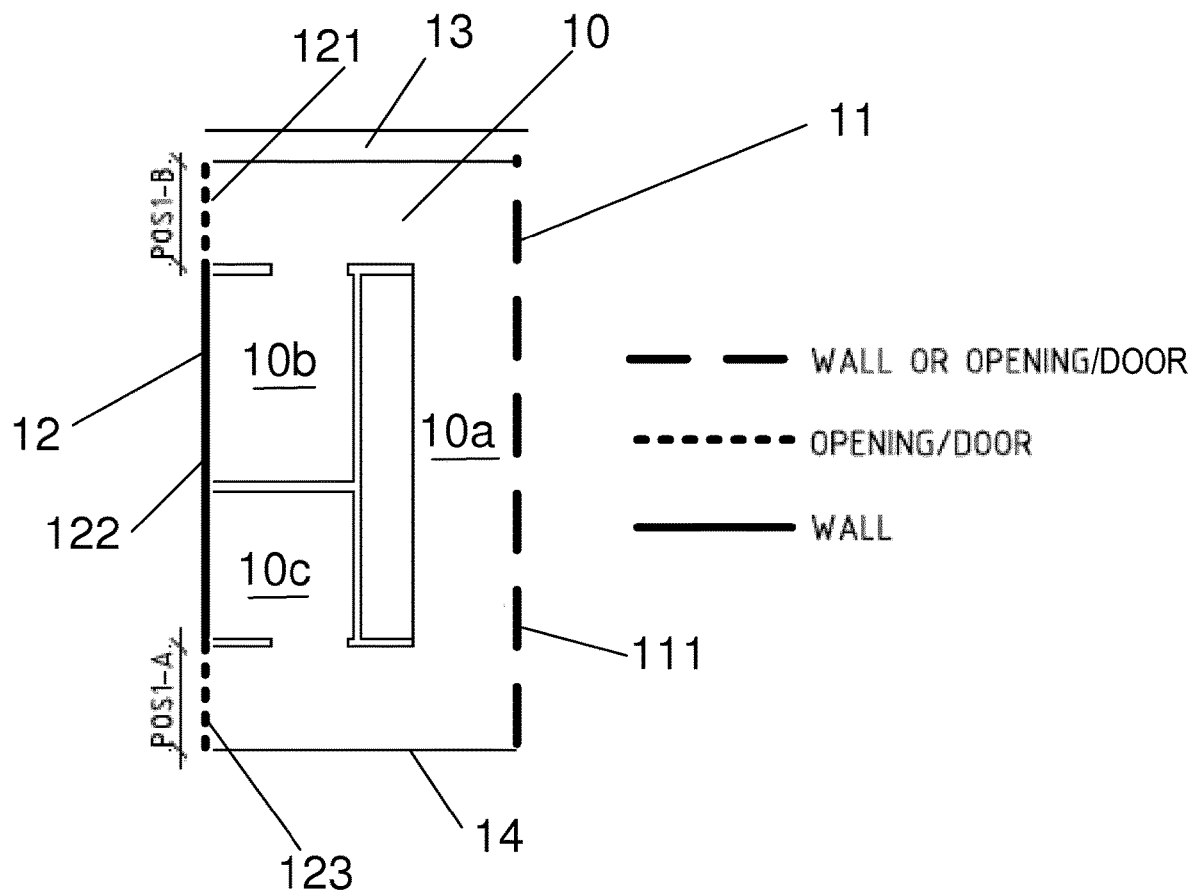
FIG. 1 shows a schematic example of a floor plan module with four side wall parts, two side wall parts of which have at least one side wall segment, the side wall segments each being assigned a value.

FIG. 1 shows a schematic example of a floor plan module 10 comprising an outer circumferential wall with four side wall parts 11, 12, 13, 14. The floor plan module 10 comprises in this case three rooms 10a, 10b and 10c, but may in other embodiments comprise any other number of rooms, including one, two and more than three. Two of the side wall parts, namely side wall parts 11 and 12, have at least one side wall segment 111 and 121-123, respectively. The side wall part 13 is in this case an exterior wall, while the side wall part 14 is an interior wall.

Each side wall segment is assigned a value, which for the sake of keeping the examples given with reference to the figures simple is chosen between the values i) opening/door, ii) wall and iii) wall or opening/door. Based on these values, the floor plan modules are assigned connection rules. Applying to all of FIGS. 1, 2, 5 and 6 the value ii) wall is shown by means of a solid line, the value i) opening/door by means of a dotted line and the value iii) wall or opening/door by means of a dashed line.

In general terms and for all embodiments of the method and system of the invention the connection rules created based on the values i) to iii), or the values i) to vii) as the case may be, can be described as follows. Firstly, two side wall segments fit if they both are assigned a value comprising the same value type. Secondly, two side wall parts fit if all side wall segments on both side wall parts fit.

In the examples illustrated on the figures, two value types are employed, namely opening/door and wall. As is described in the introductory description, the value type opening/door may be separated into the value types opening and door, respectively, such as to provide for further variations.

Thus, for the examples illustrated on the figures, the connection rules may in more detail be set up to include that side wall segments with the following respective values are fit for connection with one another:
 i) opening/door and i) opening/door,
 ii) wall and ii) wall
 iii) wall or opening/door and i) opening/door, and
 iii) wall or opening/door and ii) wall
and/or to include that side wall segments with the following respective values are not fit for connection with one another:
 i) opening/door and ii) wall.

As is described in the introductory description, when the value type opening/door is separated into the value types opening and door, respectively, such as to provide for further variations, the values and consequently also the connection rules are likewise expanded to include these further variations.

Referring again to FIG. 1, side wall part 11 has one side segment 111 assigned the value iii) wall or opening/door. Side wall part 12 has three side wall segments 121, 122, and 123, of which side wall segments 121 and 123 are assigned the value i) opening/door, while the side wall segment 122 is assigned the value ii) wall. In case the value i) opening/door was separated into the two separate values i) opening/door and vii) door, respectively, such as to provide for further variations, it would for instance be feasible that the wall segments 121 and 123 were instead assigned a new value, namely vi) opening or door, or that at least one of wall segments 121 and 123 were instead assigned another new value, namely vii) door.

Figure 2:
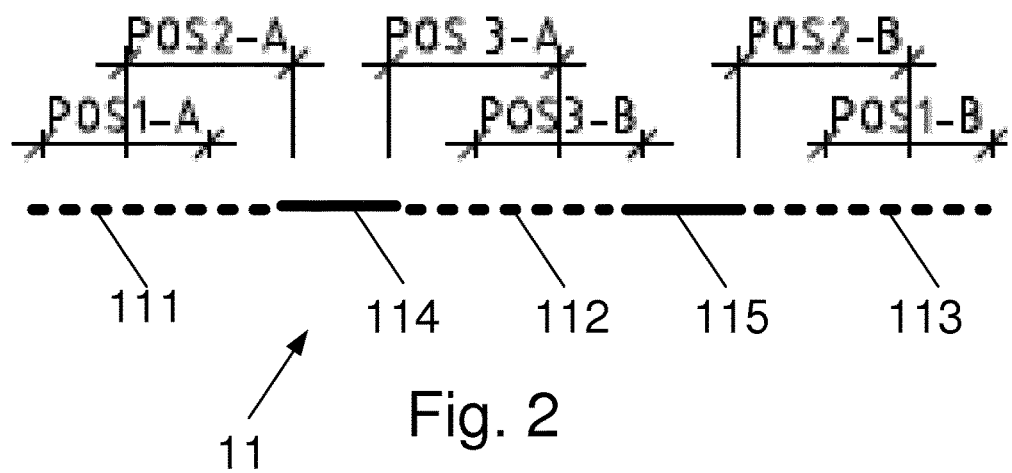
FIG. 2 shows a schematic example of a side wall part having side wall segments, which are in turn assigned positions on the side wall part.

FIG. 2 shows a schematic example of a side wall part 11 having five side wall segments 111, 112, 113, 114 and 115. Side wall segments 111, 112 and 113 are assigned the value i) opening/door, while side wall segments 114 and 115 are assigned the value ii) wall. Furthermore, side wall segments 111, 112 and 113 are in this case assigned positions corresponding to possible positions of the side wall segment in question on the side wall part. In the case illustrated on FIG. 2, side wall segment 111 is assigned and may thus be placed in any one of the possible positions POS 1-A and POS 2-A, side wall segment 112 is assigned and may thus be placed in any one of the possible positions POS 3-A and POS 3-B and side wall segment 113 is assigned and may thus be placed in any one of the possible positions POS 2-B and POS 1-B.

Irrespective of the embodiment the at least one side wall part, e.g. the side wall part 11 of FIG. 2, of each floor plan module of said list of floor plan modules may be assigned connection sub-rules. The connection sub-rules may define that at least one of an opening, wall or door is preferred or required at said one or more side wall segment, e.g. at side wall segment 111. Alternatively or additionally, the connection sub-rules may define that at least one of an opening, wall or door is preferred or required at said at least one position assigned to the one or more side wall segment. The connection sub-rules may furthermore decide if a wall or an opening should be selected when for example a side wall segment with the value iii) wall or opening is fitted to a side wall segment with the value iii) wall or opening. In this situation either a wall or an opening in the position of that side wall segment, and then the connection sub-rules may optionally decide what is preferred to show to the user as a default.

The connection sub-rules may also include connection sub-rules that define that for example a door must exist in one of, say, positions POS 1-A or POS 2-A for a given side wall part. In this case this side wall part can not fit to another side wall part unless there is a door at either POS 1-A or POS 2-A even though it passes the superior connection rule that state, say, that v) wall or door or opening fit to v) wall or door or opening for both POS 1-A or POS 2-A. Thus, with such a connection sub-rule, it can be defined that walls cannot be present in both POS 1-A or POS 2-A. With no such connection sub-rule walls may be present in both POS 1-A or POS 2-A.

Yet another connection sub-rule can indicated that it is preferred to have a door at, say, position POS 1-A. This connection sub-rule only defines what is preferred and in this regard two side wall parts can still fit together even if this connection sub-rule is not met.

Generally, and using the reference numerals of FIG. 1 as an example, for each floor plan module 10 it is stated for which side wall part 11, 12 and for which side wall segments 111, 121-123 of each side wall part 11, 12 which values i) to iii), or values i) to vii) as the case may be, are to be used, and where they are placed on or in the floor plan module 10. The same value i) to iii) can be used multiple times for the same floor plan module 10 at different locations on a side wall part such as the side wall part 12 of FIG. 1. The value sub-types (e.g. wall type, door type, opening type) that are allowed be assigned to each side wall part segment 111, 121-123 of each side wall part 11, 12 of each floor plan module 10 or to the values thereof may be pre-defined.

Furthermore, and also generally, each side wall segment can, in accordance with its assigned value, be assigned an unlimited number of value sub-types, i.e. opening types, door types or wall types, that define what kind of walls, doors or openings is allowed to be placed in that side wall segment.

Figure 3:
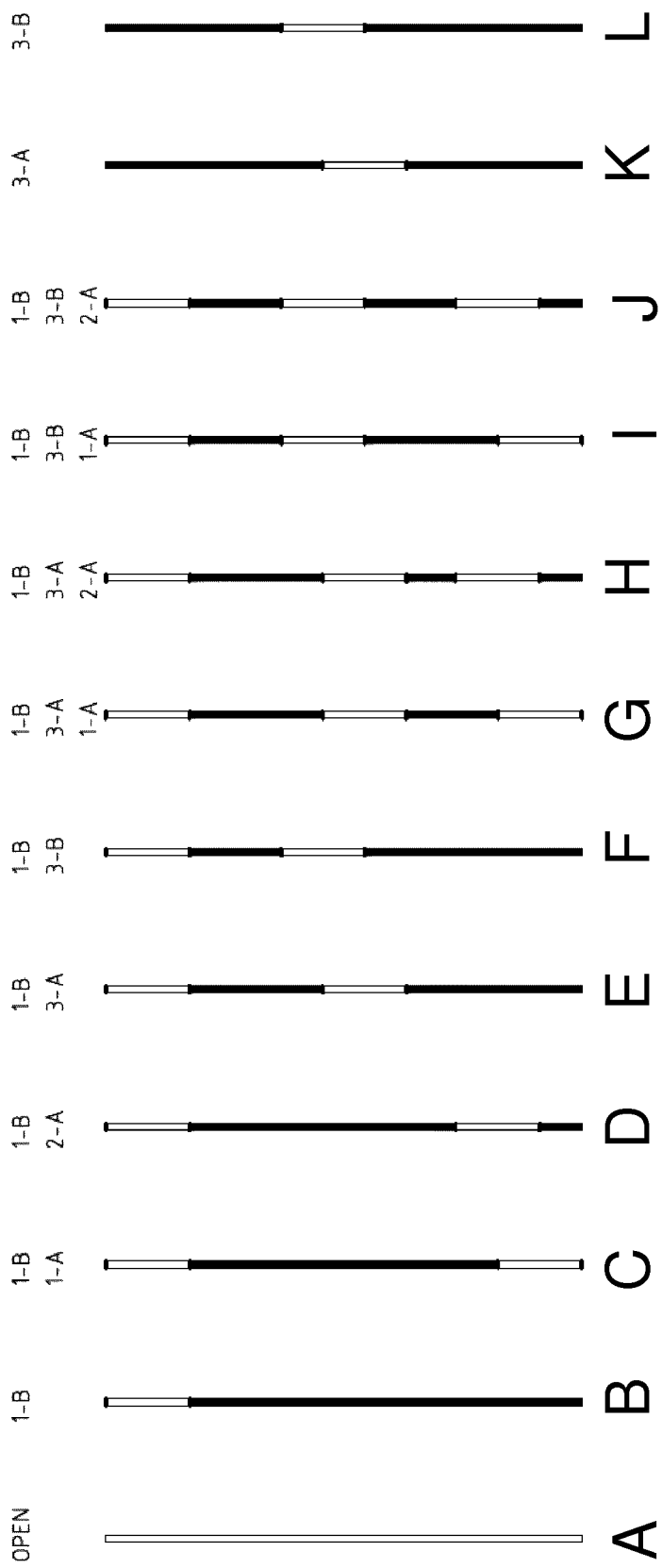
FIG. 3 shows schematic examples of various possible configurations of a side wall part having side wall segments.

Turning now to FIG. 3, further examples of side wall parts A-L are shown, using position numbering of the type illustrated on FIG. 2. In FIG. 3, and as illustrated by side wall part A being an entirely open side wall part, a side wall segment assigned the value i) opening/door is shown as a void or un-filled line, while a side wall segment assigned the value ii) wall is shown as a filled line. FIG. 3 show side wall parts A-L illustrating different examples on possible positions of side wall segments assigned the value i) opening/door. Side wall parts B, K and L each comprise one side wall segment assigned the value i) opening/door shown in three different positions. Side wall parts C, D, E and F each comprise two side wall segments assigned the value i) opening/door in respective different positions. Side wall parts G, H, I, J each comprise three side wall segments assigned the value i) opening/door in respective different positions. The position numbers shown over each side wall part A-L thus describe the positions of the openings which, when connecting with another side wall part, must correlate or fit to the positions of openings in the said other side wall part. FIG. 3 also illustrates the wide variety of possibilities obtainable by assigning positions to side wall segments.

FIG. 4 illustrates four different examples, A, B, C and D, of connections between two floor plan modules, in each case denoted 10 and 20. In each case side wall part 11 of floor plan module 10 is connected to side wall part 21 of floor plan module 20. And in each case the positions of openings and walls, respectively, correlate, such that the connection is carried out in compliance with the connection rules. Also, in each case the floor plan modules 10 and 20 are displaced in parallel with respect to one another.

In example A, to enable the side wall parts 11 and 21 to fit, side wall segments with the value i) opening/door of the side wall part 11 may be positioned in any position 1-B to 3-A, while side wall segments with the value i) opening/door of the side wall part 21 may be positioned in any position 1-A to 3-B. In example B, to enable the side wall parts 11 and 21 to fit, side wall segments with the value i) opening/door of the side wall part 11 must be positioned in position 1-B, while side wall segments with the value i) opening/door of the side wall part 21 must be positioned in position 3-B. In example C, to enable the side wall parts 11 and 21 to fit, side wall segments with the value i) opening/door of the side wall part 11 must be positioned in position 1-B or 3-A, while side wall segments with the value i) opening/door of the side wall part 21 must be positioned in position 1-A or 3-B. In example D, to enable the side wall parts 11 and 21 to fit, side wall segments with the value i) opening of the side wall part 11 must be positioned in any position 3-A, while side wall segments with the value i) opening/door of the side wall part 21 must be positioned in position 1-A. So, in all of the examples A to D shown in FIG. 4 the floor plan modules 10 and 20 are displaced in parallel with each other such as to enable a fit.

FIG. 5 illustrates an example of a connection between three floor plan modules 10, 20 and 30 together forming a floor plan.

Floor plan module 10 comprises two side wall parts 11 and 12 with side wall segments assigned values. Side wall part 11 comprises one side wall segment assigned the value ii) wall. Side wall part 12 comprises a side wall segment 121 assigned the value iii) wall or opening, the side wall segment 121 being assigned positions such that an opening may be arranged in any of positions 1-B, 2-B and 3-B, as well as a side wall segment 122 assigned the value ii) wall.

Floor plan module 20 comprises two side wall parts 21 and 22 with side wall segments assigned values. Side wall part 21 comprises one side wall segment assigned the value iii) wall or opening. Side wall part 22 comprises two opposite side wall segments 221 and 223 assigned the value i) opening/door and a further middle side wall segment 222 assigned the value ii) wall. The two opposite side wall segments 221 and 223 are further more assigned position 1-B and 1-A, respectively, such that an opening must be present in these two positions.

Floor plan module 30 comprises two side wall parts 31 and 32 with side wall segments assigned values. Side wall part 31 comprises two opposite side wall segments 311 and 313 assigned the value iii) wall or opening and a middle side wall segment 312 assigned the value ii) wall. The two opposite side wall segments 311 and 313 are further more assigned position 1-B and 1-A, respectively, such that an opening must be present in these two positions. Side wall part 32 comprises one side wall segment assigned the value iii) wall or opening.

Thus, and as illustrated, floor plan modules 10 and 20 may be connected in compliance with the connection rules by connecting side wall part 12 to side wall part 21 while forming the resulting side wall part 1020 having an opening in position 1-B. Other options would be a resulting side wall part having an opening in position 2-B or in position 3-B or even in more than one of these positions, i.e. in case a wider opening is desired.

Likewise, and as illustrated, floor plan modules 20 and 30 may be connected in compliance with the connection rules by connecting side wall part 22 to side wall part 31 while forming the resulting side wall part 2030 having two openings, one in position 1-B and one in position 1-A. In this case no other options are available, since side wall part 22 of floor plane module 20 are assigned the connection sub-rule that there must be an opening in these two positions.

FIG. 6 illustrates another example of a connection of floor plan modules, here between four floor plan modules 10, 20, 30 and 40, together forming a floor plan.

Floor plan module 10 comprises a side wall part 11 with two side wall segments 111 and 112 assigned values. Side wall segment 111 is assigned the value ii) wall, and side wall segment 112 is assigned the value iii) wall or opening, the side wall segment 112 further being assigned positions such that an opening may be arranged in any of positions 1-A, 2-A and 3-A.

Floor plan module 20 comprises two side wall parts 21 and 22 with side wall segments assigned values. Side wall part 21 comprises one side wall segment assigned the value iii) wall or opening. Side wall part 22 comprises two opposite side wall segments 221 and 223 assigned the value ii) wall and a further middle side wall segment 222 assigned the value i) opening/door. The middle side wall segment 222 is furthermore assigned position 3-A, thus forming the connection sub-rule that an opening/door must be present at position 3-A.

Floor plan module 30 comprises two side wall parts 31 and 32 with side wall segments assigned values. Side wall part 31 comprises one side wall segment assigned the value iii) wall or opening. Side wall part 32 comprises two opposite side wall segments 321 and 323 assigned the value i) opening/door and a middle side wall segment 322 assigned the value ii) wall. The two opposite side wall segments 321 and 323 are furthermore assigned position 1-B and 1-A, respectively, thus forming the connection sub-rule that an opening/door must be present at both position 1-A and 1-B.

Floor plan module 40 comprises two side wall parts 41 and 42 with side wall segments assigned values. Side wall part 42 comprises one side wall segment assigned the value ii) wall. Side wall part 41 comprises two opposite side wall segments 411 and 413 assigned the value i) opening/door and a middle side wall segment 412 assigned the value ii) wall. The two opposite side wall segments 411 and 413 are furthermore assigned position 1-B and 1-A, respectively, thus forming the connection sub-rule that an opening/door must be present at both position 1-A and 1-B.

Thus, and as illustrated, floor plan modules 10 and 20 are displaced in parallel with one another and connected in compliance with the connection rules by connecting side wall part 11 to side wall part 21 while forming the resulting side wall part 1020 having an opening in position 1-A of side wall segment 112 and an opening in position 3-A of the one side wall segment of side wall part 21. Other options would be a resulting side wall part having an opening in position 2-A or in position 3-A or even in more than one of these positions of side wall segment 112, i.e. in case a wider opening is desired, as well as an opening in a/the corresponding position(s) of the one side wall segment of side wall part 21.

Likewise, and as illustrated, floor plan modules 20 and 30 are displaced in parallel with one another and connected in compliance with the connection rules by connecting side wall part 22 to side wall part 31 while forming the resulting side wall part 2030 having an opening in position 3-A of side wall segment 222 and an opening in position 3-A of the one side wall segment of side wall part 31. In this case no other options are available, since side wall part 22 of floor plane module 20 are assigned the connection sub-rule that there must be an opening in position 3-A of side wall segment 222.

Likewise, and as illustrated, floor plan modules 30 and 40 may be connected in compliance with the connection rules by connecting side wall part 32 to side wall part 41 while forming the resulting side wall part 3040 having two openings, one in position 1-B and one in position 1-A. In this case no other options are available, since both side wall part 32 of floor plane module 30 and side wall part 41 of floor plane module 40 are assigned the connection sub-rule that there must be an opening in these two positions.

Turning now to FIGS. 7 and 8 an example of a method according to the invention will be described in more detail.

The method according to the invention comprises in the embodiment illustrated on FIG. 7 the following steps for designing an architecturally designed floor plan.

In step 1000 a list comprising a plurality of floor plan modules, each floor plan module of the list comprising a plurality of floor plan modules comprising at least one side wall part comprising at least one side wall segment, is provided. As a part of step 1000 the list may be displayed. In case such a list is already available, step 1000 may be omitted.

In step 2000 values are assigned to the at least one side wall segment of each floor plan module of the list comprising a plurality of floor plan modules. The values are chosen from the group comprising the values i) opening/door, ii) wall and iii) wall or opening as described in the above examples. Alternatively, the values are chosen from the group comprising the values i) opening, ii) wall, iii) wall or opening, iv) wall or door, v) wall or door or opening, vi) opening or door and vii) door.

Step 2000 may also, albeit optionally, comprise adding other attributes to the floor plan modules, the side wall parts and/or the side wall segments, such as value sub-types, i.e. opening type or wall type or door type, respectively, indicating the specific type of opening or wall or door, respectively or positions.

Also in step 2000, the at least one side wall part of each floor plan module of said list of floor plan modules is assigned connection rules based on said values assigned to said at least one side wall segment. The connection rules determine if and how said at least one side wall segment of said side wall part is fit for connection with a side wall segment of a side wall part of another floor plan module.

Also, in step 2000 positions and connection sub-rules may optionally be assigned to side wall parts and/or side wall segments as described above.

Also, as a part of step 2000 the list of floor plan modules may optionally be displayed.

In step 3000 a first floor plan module that the user desires to add to the architecturally designed floor plan is chosen from the list comprising a plurality of floor plan modules. The first floor plan module comprises at least a first side wall part having at least one side wall segment. As a part of step 3000 the list and/or the chosen first floor plan module may be displayed.

In steps 4000 and 5000 a sub-list of floor plan modules being fit for connection with said first floor plan module is created based on said list comprising a plurality of floor plan modules. Step 4000 will be described in further detail below with reference to FIG. 8.

In optional step 6000, the sub-list created in steps 4000 and 5000 is filtered taking into account further requirements, such as architectural preferences or preferences of the user or the customer having ordered the architecturally designed floor plan.

In optional step 7000 selected floor plan modules are selected, and in likewise optional step 8000 the selected floor plan modules are displayed on a display.

Furthermore, step 5000 and/or step 6000 may comprise displaying the created sub-list of fitting floor plan modules.

Step 4000 of the method according to the invention comprises in the embodiment illustrated on FIG. 8 the following steps for creating the sub-list.

In step 4100 a floor plan module to be matched with the first floor plan module chosen in step 3000 is picked or selected from the list of floor plan modules provided in step 1000 or 2000.

In step 4200 the thus selected floor plan module is matched with the first floor plan module chosen in step 3000. The matching of step 4200 takes place by comparing the value assigned to the at least one side wall segment of each of the plurality of floor plan modules of the list comprising a plurality of floor plan modules to the value assigned to the at least one side wall segment of the first side wall part of said first floor plan module while considering the connection rules, and where relevant the connection sub-rules. If this comparison reveals a no fit, the method may either return to step 4100 in order to pick a new module (typically if it is or can be determined that any remaining variations cannot lead to a fit) or jump to step 4400 (cf. below; typically if it is or can be determined that remaining variations may lead to a fit). If this comparison reveals a fit, the method continues with step 4300.

In step 4300 the found fitting floor plan module is added to the sub-list.

In step 4400 the floor plan module selected in step 4100 is displaced in parallel with respect to the first floor plan module chosen in step 3000. Step 4400 may also comprise other alterations to the floor plan module being matched, such as assigning a different possible to position to a given side wall segment and/or based on user-input altering the wall type or opening type or door type.

In step 4500 the thus selected and displaced and/or otherwise altered floor plan module is matched with the first floor plan module chosen in step 3000. The matching of step 4500 takes place in the same way as the matching of step 4200. If this comparison reveals a no fit, the method may either return to step 4100 in order to pick a new module (typically if it is or can be determined that any remaining variations cannot lead to a fit) or jump back to step 4400 to make a second displacement as described above (typically if it is or can be determined that remaining variations may lead to a fit). If this comparison reveals a fit, the method continues with step 4600.

In step 4600 the found fitting and displaced floor plan module is added to the sub-list.

All in all steps 4200, 4400 and 4500 taken together serve the purpose of matching all possible variations of a floor plan module selected in step 4100 with the first floor plan module chosen in step 3000. The method is thus terminated when all possible variations have been matched or compared with the first floor plan module chosen in step 3000 or alternatively when it is determined that any remaining variations cannot lead to a fit.

Finally, in optional step 4700 a floor plan module fitting the first floor plan module chosen in step 3000 is chosen from the sub-list and connected to the first module as described above.

Turning finally to FIG. 9 an embodiment of a floor plan design system 60 according to the second aspect of the invention and for creating an architecturally designed floor plan of a building is shown.

The system 60 comprises a data processing device 61 and a computer readable medium 62. The computer readable medium 62 comprises a list 63 comprising a plurality of floor plan modules and instructions 64.

The system 60 may, for instance, be a computer, a tablet or a mobile telephone. Likewise the computer readable medium 62 may be an internal medium, such as a hard-drive, or an external medium, such as a USB stick or an external hard-drive.

The instructions 64 are configured for execution at the data processing device 61 such as to cause the data processing device 61 to perform a method according to any one or more embodiments of a method according to the first aspect of the invention and as described above. A more comprehensive description of the contents of the instructions 64 is given in both the introductory description and with reference to FIGS. 7 and 8.

The system 60 may furthermore comprise a display element 65 on which lists of floor plan modules, floor plan modules selected by a user and/or the floor plan may be displayed.

The system 60 may furthermore be configured to receive an input signal in the form of a user selection 67. To this end an input device 66 may be provided. The input device 66 my form part of the system or may be separate from the system. The input device 66 may be connected to the system 60 by means of a threaded or a wireless connection. The user selection 67 may be any type of user selection, including but not limited to selection of a floor plan module and of a specific desired type of side wall part, side wall segment or type of side wall segment.

The person skilled in the art realizes that the present invention by no means is limited to the preferred embodiments described above. On the contrary, many modifications and variations are possible within the scope of the appended claims.

For instance it would in principle be feasible to define even more value types and consequently even more values and even more connection rules than the above mentioned in order to provide for even larger variations.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A method for creating an architecturally designed floor plan of a building and construction of a real life building according to the architecturally designed floor plan of the building, the method comprising the steps of:
  creating the architecturally designed floor plan of the building, including sub steps of
  choosing a first floor plan module to be added to said architecturally designed floor plan from a list comprising a plurality of floor plan modules, each said floor plan module of said list comprising a plurality of floor plan modules comprising at least one side wall part comprising at least one side wall segment, and said first floor plan module comprising at least a first side wall part having at least one side wall segment,
  based on said list comprising a plurality of floor plan modules, creating a sub-list of floor plan modules being fit for connection with said first floor plan module, characterized in that
  said at least one side wall segment of each floor plan module of said list comprising a plurality of floor plan modules is assigned a value chosen from the group comprising the values i) opening, ii) wall, iii) wall or opening, iv) wall or door, v) wall or door or opening, vi) opening or door and vii) door, in that
  said at least one side wall part of each floor plan module of said list of floor plan modules is assigned connection rules based on said values assigned to said at least one side wall segment, said connection rules determining if and how said at least one side wall segment of said side wall part is fit for connection with a side wall segment of a side wall part of another floor plan module, and in that
  the step of creating said sub-list of floor plan modules further comprises
    matching the value assigned to said at least one side wall segment of each of the plurality of floor plan modules of said list comprising a plurality of floor plan modules to the value assigned to said at least one side wall segment of said first side wall part of said first floor plan module while considering said connection rules to retrieve floor plan modules being fit for connection with said first floor plan module and adding to said sub-list said retrieved floor plan modules being fit for connection with said first floor plan module,
  under a condition the at least one side wall segment is altered to create an altered one side wall segment, matching a value assigned to the altered one side wall segment to the value assigned to the at least one side wall segment of the first side wall part of the first floor plan module, including in the architecturally designed floor plan of the building, at least one of the at least one side wall segment and the altered one side wall segment having a value that matched the value of the at least one side wall segment of the first side wall part of the first floor plan module; and constructing the real life building according to the architecturally designed floor plan of the building.

2. A method according to claim 1, wherein said first side wall part of said first floor plan module comprises a plurality of side wall segments, wherein each side wall segment of said plurality of side wall segments of said first side wall part of said first floor plan module is assigned a value chosen from the group comprising the values i) opening, ii) wall, iii) wall or opening, iv) wall or door, v) wall or door or opening, vi) opening or door and vii) door, and wherein the step of creating said sub-list of floor plan modules furthermore comprises comparing the value assigned to said at least one side wall segment of each of the plurality of floor plan modules of said list comprising a plurality of floor plan modules to the value assigned to each side wall segment of said plurality of side wall segments of said first side wall part of said first floor plan module while considering said connection rules to retrieve floor plan modules being fit for connection with said first floor plan module and adding to said sub-list said retrieved floor plan modules being fit for connection with said first floor plan module.

3. A method according to claim 1, wherein each floor plan module of said list of floor plan modules comprises at least one side wall part having a plurality of side wall segments, wherein each side wall segment of said plurality of side wall segments is assigned a value chosen from the group comprising the values i) opening, ii) wall, iii) wall or opening, iv) wall or door, v) wall or door or opening, vi) opening or door and vii) door, and wherein the step of creating said sub-list of floor plan modules furthermore comprises comparing the value assigned to each side wall segment of said plurality of side wall segments of each of the plurality of floor plan modules of said list comprising a plurality of floor plan modules to the value assigned to said plurality of side wall segments of said first side wall part of said first floor plan module while considering said connection rules to retrieve floor plan modules being fit for connection with said first floor plan module and adding to said sub-list said retrieved floor plan modules being fit for connection with said first floor plan module.

4. A method according to claim 1, wherein said connection rules include that side wall segments with the following respective values are fit for connection with one another:
i) opening and any one of i) opening, iii) wall or opening, v) wall or door or opening, and vi) opening or door,
ii) wall and any one of ii) wall, iii) wall or opening, iv) wall or door and v) wall or door or opening,
iii) wall or opening and any one or more of i) opening, ii) wall, iii) wall or opening, iv) wall or door, v) wall or door or opening and vi) opening or door,
iv) wall or door and any one of ii) wall, iii) wall or opening, iv) wall or door, v) wall or door or opening, vi) opening or door and vii) door, v) wall or door or opening and any one of i) opening, ii) wall, iii) wall or opening, iv) wall or door, v) wall or door or opening, vi) opening or door and vii) door,
vi) opening or door and any one of i) opening, iii) wall or opening, iv) wall or door, v) wall or door or opening, vi) opening or door and vii) door, and
vii) door and any one of iv) wall or door, v) wall or door or opening, vi) opening or door and vii) door,
and/or wherein
said connection rules include that side wall segments with the following respective values are not fit for connection with one another:
i) opening and any one of ii) wall, iv) wall or door, and vii) door,
ii) wall and any one of i) opening, vi) opening or door and vii) door,
iii) wall or opening and vii) door,
iv) wall or door and i) opening,
vi) opening or door and ii) wall, and
vii) door and any one of i) opening, ii) wall and iii) wall or opening.

5. A method according to claim 1, wherein said values assigned to said at least one side wall segment comprise at least one value type chosen from the group comprising wall, opening and door, and wherein the value type wall of any one or more side wall segment is assigned one of a plurality of wall types, such as for example an exterior wall, an interior wall, a brick wall, a concrete wall, a gypsum wall, a glass wall, a wooden wall, a load-carrying wall, a non-load-carrying wall and any combination thereof, and/or wherein the value type opening of any one or more side wall segment is assigned one of a plurality of opening types, such as for example a window, a side hung window, a center hung window, a top hung window, a leafless opening, a ventilation opening and any combination thereof, and/or wherein the value type door of any one or more side wall segment is assigned one of a plurality of door types, such as for example a glass door, a wooden door, a front door, a garage door, a gate, a one-leafed sliding or rolling door and a two-leafed sliding or rolling door.

6. A method according to claim 1, wherein any one or more side wall segment is assigned at least one position on an associated side wall part of a floor plan module, and wherein said step of creating said sub-list comprises comparing the value assigned to said any one or more side wall segment assigned a position in each possible position to the value assigned to said plurality of side wall segments of said first side wall part of said first floor plan module while considering said connection rules.

7. A method according to claim 6, wherein said at least one side wall part of each floor plan module of said list of floor plan modules is assigned connection sub-rules, said connection sub-rules defining that at least one of an opening, wall or door is preferred or required at said one or more side wall segment and/or at said at least one position assigned to said one or more side wall segment.

8. A method according to claim 6, and further comprising the step of:
based on user-input altering any one of the wall type, opening type and door type.

9. A method according to claim 1, wherein the step of creating a sub-list of floor plan modules furthermore comprises filtering out floor plan modules of said list of floor plan modules which, when considering said connection rules, during said comparing turn out to not to be fit for connection with said first floor plan module, and/or which do not comply with predefined architectural preferences.

10. A method according to claim 1, and further comprising the steps of:
choosing a second floor plan module from said sub-list comprising a plurality of floor plan modules to be added to said architecturally designed floor plan, said second floor plan module comprising at least a second side wall part having at least one side wall segment,
connecting said side wall segments of said first side wall part of said first floor plan module to said side wall segments of said second side wall part of said second floor plan module, wherein
the step of connecting said side wall segments of said first side wall part of said first floor plan module to said side wall segments of said second side wall part of said second floor plan module is performed in such a way as to comply with said connection rules.

11. A method according to claim 10, wherein the step of connecting said side wall segments of said first side wall part of said first floor plan module to said side wall segments of said second side wall part of said second floor plan module further comprises replacing the side wall part of one of the first floor plan module and the second floor plan module with the side wall part of the other one of the first floor plan module and the second floor plan module.

12. A method according to claim 1, and further comprising one or more of the following steps:
displaying said list comprising a plurality of floor plan modules to a user,
displaying said chosen first floor plan module to a user,
displaying said sub-list to a user, and
displaying said architecturally designed floor plan to a user.

13. A floor plan design system for creating an architecturally designed floor plan of a building and construction of a real life building according to the architecturally designed floor plan of the building, the system comprising:
a data processing device and a non-transitory computer readable medium, the computer readable medium comprising:
a list comprising a plurality of floor plan modules, each said floor plan module comprising at least one side wall part comprising at least one side wall segment, and
instructions configured for execution at said data processing device such as to cause the data processing device to create the architecturally designed floor plan of the building, the instructions further configured to cause the data processing device to:
receive a user selection and in reaction to said user selection retrieve a first floor plan module to be added to said architecturally designed floor plan from said list comprising a plurality of floor plan modules, said first floor plan module comprising at least a first side wall part having at least one side wall segment, and
based on said list comprising a plurality of floor plan modules, create a sub-list of floor plan modules being fit for connection with said first floor plan module,
assign to said at least one side wall segment of each floor plan module of said list comprising a plurality of floor plan modules a value chosen from the group comprising the values i) opening, ii) wall, iii) wall or opening, iv) wall or door, v) wall or door or opening, vi) opening or door and vii) door,
assign to said at least one side wall part of each floor plan module of said list of floor plan modules connection rules based on said values assigned to said at least one side wall segment, said connection rules determining if and how said at least one side wall segment of said side wall part is fit for connection with a side wall segment of a side wall part of another floor plan module,
create said sub-list of floor plan modules by matching the value assigned to said at least one side wall segment of each of the plurality of floor plan modules of said list comprising a plurality of floor plan modules to the value assigned to said at least one side wall segment of said first side wall part of said first floor plan module while considering said connection rules to retrieve floor plan modules being fit for connection with said first floor plan module and adding to said sub-list said retrieved floor plan modules being fit for connection with said first floor plan module, and
under a condition that the at least one side wall segment is altered to create an altered one side wall segment, matching a value assigned to the altered one side wall segment to the value assigned to the at least one side wall segment of the first side wall part of the first floor plan module, and
include in the architecturally designed floor plan of the building, at least one of the at least one side wall segment and the altered one side wall segment having a value that matched the value of the at least one side wall segment of the first side wall part of the first floor plan module, so construction of the real life building includes at least one of at least one side wall segment and the altered one side wall segment having a value that matched the value of the at least one side wall segment of the first side wall part of the first floor plan module.

14. A system according to claim 13, wherein said first side wall part of said first floor plan module comprises a plurality of side wall segments, and wherein the instructions are further configured to cause the data processing device to:
assign to each side wall segment of said plurality of side wall segments of said first side wall part of said first floor plan module a value chosen from the group comprising the values i) opening, ii) wall, iii) wall or opening, iv) wall or door, v) wall or door or opening, vi) opening or door and vii) door, and
create said sub-list of floor plan modules by furthermore comparing the value assigned to said at least one side wall segment of each of the plurality of floor plan modules of said list comprising a plurality of floor plan modules to the value assigned to each side wall segment of said plurality of side wall segments of said first side wall part of said first floor plan module while considering said connection rules to retrieve floor plan modules being fit for connection with said first floor plan module and adding to said sub-list said retrieved floor plan modules being fit for connection with said first floor plan module.

15. A system according to claim 13, wherein each floor plan module of said list of floor plan modules comprises at least one side wall part having a plurality of side wall segments, and wherein the instructions are further configured to cause the data processing device to:
assign to each side wall segment of said plurality of side wall segments a value chosen from the group comprising the values i) opening, ii) wall, iii) wall or opening, iv) wall or door, v) wall or door or opening, vi) opening or door and vii) door, and wherein
create said sub-list of floor plan modules by furthermore comparing the value assigned to each side wall segment of said plurality of side wall segments of each of the plurality of floor plan modules of said list comprising a plurality of floor plan modules to the value assigned to said plurality of side wall segments of said first side wall part of said first floor plan module while considering said connection rules to retrieve floor plan modules being fit for connection with said first floor plan module and adding to said sub-list said retrieved floor plan modules being fit for connection with said first floor plan module.

16. A system according to claim 13, wherein said connection rules include that side wall segments with the following respective values are fit for connection with one another:
   i) opening and any one of i) opening, iii) wall or opening, v) wall or door or opening, and vi) opening or door,
   ii) wall and any one of ii) wall, iii) wall or opening, iv) wall or door and v) wall or door or opening,
   iii) wall or opening and any one or more of i) opening, ii) wall, iii) wall or opening, iv) wall or door, v) wall or door or opening and vi) opening or door,
   iv) wall or door and any one of ii) wall, iii) wall or opening, iv) wall or door, v) wall or door or opening, vi) opening or door and vii) door,
   v) wall or door or opening and any one of i) opening, ii) wall, iii) wall or opening, iv) wall or door, v) wall or door or opening, vi) opening or door and vii) door,
   vi) opening or door and any one of i) opening, iii) wall or opening, iv) wall or door, v) wall or door or opening, vi) opening or door and vii) door, and
   vii) door and any one of iv) wall or door, v) wall or door or opening, vi) opening or door and vii) door,
   and/or wherein
   said connection rules include that side wall segments with the following respective values are not fit for connection with one another:
   i) opening and any one of ii) wall, iv) wall or door, and vii) door,
   ii) wall and any one of i) opening, vi) opening or door and vii) door,
   iii) wall or opening and vii) door,
   iv) wall or door and i) opening,
   vi) opening or door and ii) wall, and
   vii) door and any one of i) opening, ii) wall and iii) wall or opening.

17. A system according to claim 13, wherein the instructions are further configured to cause the data processing device to assign to the values assigned to said at least one side wall segment at least one value type chosen from the group comprising wall, opening and door, and wherein
   the instructions are further configured to cause the data processing device to assign to the value type wall of any one or more side wall segment one of a plurality of wall types, such as an exterior wall, an interior wall, a brick wall, a concrete wall, a gypsum wall, a glass wall, a wooden wall, a load-carrying wall, a non-load-carrying wall and any combination thereof, and/or wherein
   the instructions are further configured to cause the data processing device to assign to the value type opening of any one or more side wall segment one of a plurality of opening types, such as a door, a window, a side hung window, a center hung window, a top hung window, a leafless opening, a ventilation opening and any combination thereof, and/or wherein
   the instructions are further configured to cause the data processing device to assign to the value type door of any one or more side wall segment one of a plurality of door types, such as for example a glass door, a wooden door, a front door, a garage door, a gate, a one-leafed sliding or rolling door and a two-leafed sliding or rolling door.

18. A system according to claim 17, wherein the instructions are further configured to cause the data processing device to be based on user-input altering any one of the wall type, opening type and door type.

19. A system according to claim 13, wherein the instructions are further configured to cause the data processing device to assign to any one or more side wall segment a position on an associated side wall part of a floor plan module, and in reaction to a user selection to alter said position within predetermined conditions for altering said position, and to create said sub-list by furthermore comparing the value assigned to said any one or more side wall segment assigned a position in each possible position to the value assigned to said plurality of side wall segments of said first side wall part of said first floor plan module while considering said connection rules.

20. A system according to claim 19, wherein the instructions are further configured to cause the data processing device to assign to said at least one side wall part of each floor plan module of said list of floor plan modules connection sub-rules, said connection sub-rules defining that at least one of an opening, wall or door is preferred or required at said one or more side wall segment and/or at said at least one position assigned to said one or more side wall segment.

21. A system according to claim 13, wherein the instructions are further configured to cause the data processing device to:
   during creation of said sub-list of floor plan modules, filter out floor plan modules of said list of floor plan modules which, when considering said connection rules, during said comparing turn out to not to be fit for connection with said first floor plan module, and/or which do not comply with predefined architectural preferences.

22. A system according to claim 13, wherein the instructions are further configured to cause the data processing device to:
   receive a user selection and in reaction to said user selection retrieve a second floor plan module from said sub-list comprising a plurality of floor plan modules to be added to said architecturally designed floor plan, said second floor plan module comprising at least a second side wall part having at least one side wall segment, and
   connect said side wall segments of said first side wall part of said first floor plan module to said side wall segments of said second side wall part of said second floor plan module in compliance with said connection rules.

23. A system according to claim 22, wherein the instructions are further configured to cause the data processing device to:
   during connection of said side wall segments of said first side wall part of said first floor plan module to said side wall segments of said second side wall part of said second floor plan module in compliance with said connection rules, replacing the side wall part of one of the first floor plan module and the second floor plan module with the side wall part of the other one of the first floor plan module and the second floor plan module.

24. A system according to claim 13, and further comprising a display element, and wherein the instructions are further configured to cause the data processing device to display on said display element:

said list comprising a plurality of floor plan modules, and/or
said chosen first floor plan module, and/or
said sub-list, and/or
said floor plan of said building.

* * * * *